United States Patent
Groh et al.

(10) Patent No.: US 10,392,291 B2
(45) Date of Patent: Aug. 27, 2019

(54) METHOD OF MAKING AN OPTICAL FIBER PREFORM AND HANDLE FOR USE IN MAKING OF OPTICAL FIBER PREFORM

(71) Applicant: CORNING INCORPORATED, Corning, NY (US)

(72) Inventors: Raymond D. Groh, Wilmington, NC (US); Ming-Jun Li, Horseheads, NY (US); Alper Ozturk, Elmira, NY (US); Chunfeng Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 303 days.

(21) Appl. No.: 14/970,642

(22) Filed: Dec. 16, 2015

(65) Prior Publication Data

US 2016/0168007 A1    Jun. 16, 2016

Related U.S. Application Data

(60) Provisional application No. 62/092,447, filed on Dec. 16, 2014.

(51) Int. Cl.
*C03B 37/014* (2006.01)
*C03B 37/012* (2006.01)

(52) U.S. Cl.
CPC .. *C03B 37/01486* (2013.01); *C03B 37/01225* (2013.01); *C03B 37/01446* (2013.01); *C03B 2201/28* (2013.01); *C03B 2201/31* (2013.01); *C03B 2201/32* (2013.01); *C03B 2201/42* (2013.01); *C03B 2201/50* (2013.01)

(58) Field of Classification Search
CPC ........................................ C03B 37/014–01892
See application file for complete search history.

(56) References Cited

U.S. PATENT DOCUMENTS

| 4,125,388 A | 11/1978 | Powers |
| 4,251,251 A | 2/1981 | Blankenship |
| 4,263,031 A | 4/1981 | Schultz |
| 4,349,373 A | 9/1982 | Sterling et al. |

(Continued)

FOREIGN PATENT DOCUMENTS

| EP | 0578244 A1 | 7/1993 |
| JP | 2003137584 A | 5/2003 |

(Continued)

OTHER PUBLICATIONS

U.S. Non-Final Office Communication, dated Aug. 31, 2015, Confirmation No. 8694, U.S. Appl. No. 14/546,020, dated Nov. 18, 2014.

(Continued)

*Primary Examiner* — Lisa L Herring

(57) ABSTRACT

A method for forming an optical fiber preform is provided. The method includes inserting a glass core cane into a glass sleeve such that the glass sleeve surrounds a portion of the glass core cane and such that there is a gap between the glass sleeve and the portion of the glass core cane surrounded by the glass sleeve. The method further includes depositing silica soot onto at least a portion of the glass core cane and at least a portion of the glass sleeve to form a silica soot preform, and flowing gas through the gap during processing of the silica soot preform.

10 Claims, 4 Drawing Sheets

(56) References Cited

U.S. PATENT DOCUMENTS

| | | | |
|---|---|---|---|
| 4,362,545 A * | 12/1982 | Bailey | C03B 37/01486 118/728 |
| 4,486,212 A | 12/1984 | Berkey | |
| 4,629,485 A | 12/1986 | Berkey | |
| 4,684,383 A | 8/1987 | Cavender, Jr. et al. | |
| 4,784,465 A | 11/1988 | Berkey | |
| 5,116,400 A | 5/1992 | Abbott et al. | |
| 5,236,481 A | 8/1993 | Berkey | |
| 5,396,322 A | 3/1995 | Lawrence et al. | |
| 5,788,734 A | 8/1998 | Hoshino et al. | |
| 6,263,706 B1 | 7/2001 | Deliso et al. | |
| 6,418,757 B1 | 7/2002 | Berkey et al. | |
| 6,477,305 B1 | 11/2002 | Berkey et al. | |
| 6,904,772 B2 | 6/2005 | Berkey et al. | |
| 7,672,557 B2 | 3/2010 | Allen et al. | |
| 8,132,429 B2 | 3/2012 | Pedrido | |
| 8,464,556 B2 | 6/2013 | Bookbinder et al. | |
| 2002/0005051 A1 | 1/2002 | Brown et al. | |
| 2002/0181076 A1 | 12/2002 | Bickham et al. | |
| 2004/0107734 A1 * | 6/2004 | Kenkare | C03B 37/01884 65/378 |
| 2010/0122558 A1 | 5/2010 | Jewell et al. | |
| 2010/0310219 A1 * | 12/2010 | Bookbinder | C03B 37/01446 385/123 |
| 2011/0074065 A1 * | 3/2011 | Batchelder | B29C 67/0055 264/308 |
| 2011/0100064 A1 | 5/2011 | Sarkar et al. | |
| 2012/0118019 A1 * | 5/2012 | Takahashi | C03B 37/01231 65/393 |
| 2014/0186645 A1 * | 7/2014 | Briere | C03B 37/01248 428/542.8 |
| 2015/0143852 A1 | 5/2015 | Bookbinder et al. | |

FOREIGN PATENT DOCUMENTS

| | | |
|---|---|---|
| WO | 2000064825 | 11/2000 |
| WO | 2002028790 A1 | 4/2002 |
| WO | 200249977 A2 | 6/2002 |
| WO | 2007059336 A1 | 5/2007 |

OTHER PUBLICATIONS

International Search Report and Written Opinion, dated Mar. 12, 2015, International Application No. PCT/US2014/066849, International Filing Date Nov. 21, 2014.

Brown et al., "Determination of Silicon, Germanium, and Tin in Their Volatile Organo Compounds", Analytical Chemistry, vol. 30, No. 10, Oct. 1958, pp. 1689-1691.

Cognolato, "Chemical Vapour Deposition for Optical Fibre Technology", Journal De Physique IV, Colloque C5, supplement au Journal de Physique II, vol. 5, Jun. 1995, pp. C5-975-C5-987.

Logunov et al., "Light diffusing optical fiber for illumination", Renewable Energy and the Environment Congress, 2013, DT3E.4.

Khopin, et al., "Doping of Optical Fiber Preforms via Porous Silica Layer Infiltration with Salt Solutions", Inorganic Materials, vol. 41, No. 3, 2005, pp. 303-307.

International Searching Authority; Patent Cooperation Treat; International Search Report and Written Opinion; International Application No. PCT/US2015/065669; dated Feb. 25, 2016; pp. 1-12.

United States Patent and Trademark Office; Final Rejection Office Action; U.S. Appl. No. 14/546,020; dated Mar. 3, 2016; pp. 1-17.

* cited by examiner

METHOD OF MAKING AN OPTICAL FIBER PREFORM AND HANDLE FOR USE IN MAKING OF OPTICAL FIBER PREFORM

This application claims the benefit of priority to U.S. Application No. 62/092,447 filed on Dec. 16, 2014 the content of which is incorporated herein by reference in its entirety.

FIELD

The present disclosure relates methods for forming optical fiber preforms. More particularly, the present disclosure relates to handles for use in forming optical fiber preforms.

BACKGROUND

Soot preforms are commonly used to form optical fiber glass preforms in optical fiber manufacturing. Making optical fiber preforms that are free of defects, and that can be readily processed, is commonly a time consuming process. While conventional processes for forming soot preforms result in the deposition of generally porous layers of soot, some portions of a resulting soot preform tend to be less porous than other portions of a resulting soot preform. The flow of processing gases, which are contacted with a soot preform during various processing steps, through the less porous portions of the soot preform may be limited as compared to the flow of processing gases through the porous portions of the soot preform.

Conventionally, forming a consolidated glass preform that is free of voids, trapped gas bubbles, or other defects includes sintering soot preforms very slowly in a furnace at approximately atmospheric pressure. As the soot preform is sintered, the pores transition from open pores to closed pores, and sintering rates must be reduced so that gas does not become trapped in the closed pores. Even after the pores have been closed, additional processing is completed to diffuse the sinter gas out of the glass preform. Diffusion of the gas avoids the formation of gas seeds at high temperatures associated with drawing the consolidated glass preforms into optical fiber. Diffusion of gas may be of particular interest when preforms are bulk sintered. During bulk sintering, the entire preform is heated to temperatures within a sintering temperature range, and, generally, the outermost portions of the preform densify first. Additionally, the less porous portions of the soot preform tend to densify before the porous portions of the soot preform. Once densified, these portions of the soot preform act as a barrier and minimize paths for the diffusion of gas out of the preform.

While some reduction in the sintering period may be accomplished by using a high permeability sinter gas such as, but not limited to, helium (in contrast to low permeability gases such as, but not limited to, nitrogen, argon and oxygen), the sintering period remains relatively long in order to ensure that the helium does not become trapped in the consolidated glass preform.

Conventionally, diffusion of the gas may be accomplished by placing sintered glass preforms in holding ovens at temperatures ranging from about 800° C. to about 1,200° C. to diffuse interstitial gas that becomes dissolved in the glass perform during sintering. While the period in a holding oven for interstitial gas to diffuse out of the glass preform increases with increasing glass preform size, it is common for the glass preform to remain in the holding oven for at least more than 1.0 hour.

The combination of the time to perform steps in the manufacture of optical fiber glass preforms results in very long processing times for the optical fiber preforms, which negatively impacts the cost of manufacturing optical fiber.

SUMMARY

According to an embodiment of the present disclosure, a method for forming an optical fiber preform is provided. The method includes inserting a glass core cane into a glass sleeve such that the glass sleeve surrounds a portion of the glass core cane and such that there is a gap between the glass sleeve and the portion of the glass core cane surrounded by the glass sleeve. The method further includes depositing silica soot onto at least a portion of the glass core cane and at least a portion of the glass sleeve to form a silica soot preform, and flowing gas through the gap during processing of the silica soot preform.

According to another embodiment of the present disclosure, a method for forming an optical fiber preform is provided. The method includes depositing silica soot onto at least a portion of a glass core cane and at least a portion of a glass handle attached to the glass core cane to form a silica soot preform. The handle includes a hollow interior portion fluidly connected to the exterior of handle by at least one opening in a handle wall. The method further includes flowing gas through the at least one opening and into the interior of the handle during processing of the silica soot preform.

According to another embodiment of the present disclosure, a handle assembly for use in forming an optical fiber preform is provided. The handle assembly includes a glass core cane, and a glass sleeve situated around a portion of the glass core cane such that there is a gap between the glass sleeve and the portion of the glass core cane surrounded by the glass sleeve. The handle assembly further includes a silica soot preform deposited on at least a portion of the glass core cane and at least a portion of the glass sleeve.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1:
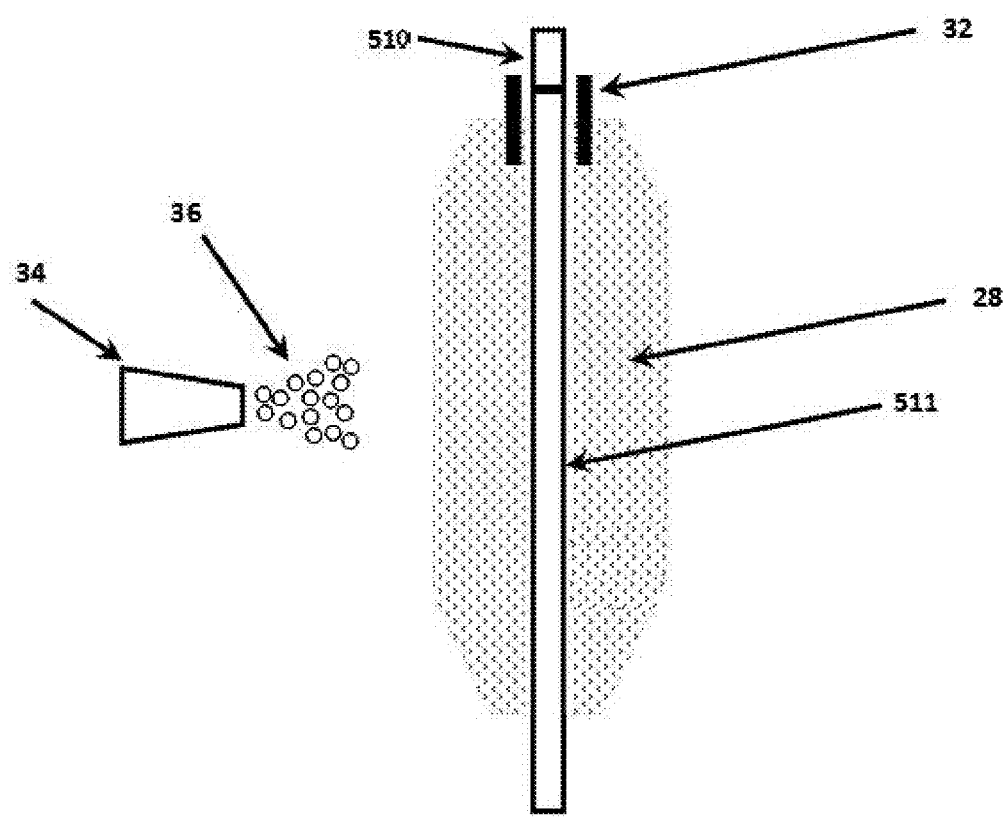
FIG. 1 illustrates a soot preform in accordance with an embodiment of the present disclosure.

Reference will now be made in detail to the present embodiment(s), example(s) of which is/are illustrated in the accompanying drawings. Whenever possible, the same reference numerals will be used throughout the drawings to refer to the same or like parts.

The singular forms "a" "an" and "the" include plural referents unless the context clearly dictates otherwise. The endpoints of all ranges reciting the same characteristic are independently combinable and inclusive of the recited endpoint. All references are incorporated herein by reference.

As used herein, the term "soot" refers to silica or doped silica particles having dimensions of about 5.0 nm to about 5.0 microns. The term "preform" refers to an article that may be used in making an optical glass article, an optical preform, an optical fiber preform and/or that may be drawn into an optical fiber. The term "consolidate" refers to a process where a soot preform, or a portion of a soot preform, is heat treated to form a closed porosity glass preform or a closed porosity portion of a glass preform.

The present disclosure is directed to handle assemblies that facilitate the formation of optical fiber preforms from soot preforms. The handle assembly may include a handle having a hollow interior fluidly connected to the soot preform by openings. During processing of the soot preform, gas may flow from the soot preform through the openings and into the hollow interior of the handle. Alternatively, the handle assembly may include a handle attached to a glass core cane and a tubular glass sleeve situated around a portion of the handle and a portion of the glass core cane such that there is a gap between the tubular glass sleeve and the portions of the handle and the glass core cane surrounded by the tubular glass sleeve. In such a design, the inner diameter of the tubular glass sleeve may be greater than the outer diameter of the glass core cane and the outer diameter of the portion of the handle surrounded by the tubular glass sleeve. During processing of the soot preform, gas may flow from the soot preform through the gap between the tubular glass sleeve and glass core cane.

As is conventional, a small diameter alkali-doped glass core cane may be used as a starting rod upon which additional porous glass soot may be deposited to form a soot preform. The soot preform may be formed using, for example, but without limitation, an outside vapor deposition (OVD) process such as is described in U.S. Pat. Nos. 4,784,465 and 6,477,305, the specifications of which are incorporated by reference in their entirety. Other chemical vapor deposition (CVD) processes such as vapor axial deposition (VAD) may also be used for making soot preforms disclosed herein. As described above, a glass handle may be attached to the glass core cane, such as by welding. The glass handle is a temporary fixture which aids in providing support during the processing steps of the soot preform, but is not part of the final optical fiber produced from the soot preform.

As is shown in FIG. 1, a silica based reaction product, or soot 36, is formed by reacting at least one glass forming precursor compound in an oxidizing atmosphere, such as in burner 34. Soot 36 used to form soot preform 28 may be made by chemically reacting at least one glass forming precursor compound in an oxidizing atmosphere. The glass forming precursor compound can be for example, but without limitation, a pure silica product precursor such as $SiCl_4$ or octamethylcyclotetrasiloxane (OMCTS). Soot 36 may also be made by simultaneous reaction of at least one glass forming precursor compound and at least one dopant precursor compound in an oxidizing atmosphere. Dopant precursor compounds such as, but not limited to, $GeCl_4$, $TiCl_4$, $POCl_3$ and $AlCl_3$, may be used.

As is further illustrated in FIG. 1, a glass core cane 511, with handle 510 attached, is inserted into a tubular glass sleeve 32 and mounted on a lathe (not illustrated). The lathe rotates and translates handle 510, glass core cane 511 and tubular glass sleeve 32 in close proximity with burner 34 and soot 36 is directed toward glass core cane 511 and tubular glass sleeve 32 as they are rotated and translated. During formation of soot preform 28, at least a portion of soot 36 is deposited on glass core cane 511 and on a portion of tubular glass sleeve 32. Alternatively, instead of translating handle 510, glass core cane 511 and tubular glass sleeve 32, burner 34 translates along a length of glass core cane 511 and a portion of tubular glass sleeve 32.

Figure 2A:
FIG. 2A is a cross-sectional view of a handle in accordance with an embodiment of the present disclosure.
Figure 2B:
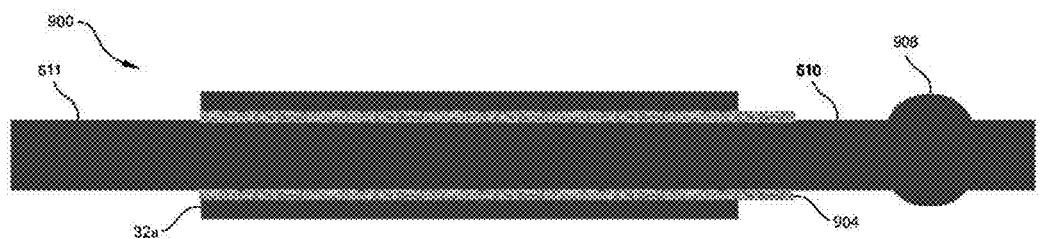
FIG. 2B is a cross-sectional view of a handle in accordance with an embodiment of the present disclosure.
Figure 2C:
FIG. 2C is a cross-sectional view of a handle in accordance with an embodiment of the present disclosure.

FIGS. 2A-2C illustrate an exemplary handle assembly 900 in accordance with an embodiment of the present disclosure. Handle assembly 900 includes a handle 510 attached to a glass core cane 511. Handle assembly 900 further includes a tubular glass sleeve 32a situated around a portion of handle 510 and a portion of glass core cane 511. As shown, the inner diameter of tubular glass sleeve 32a is greater than the outer diameter of the portions of handle 510 and of glass core cane 511 surrounded by tubular glass sleeve 32a such that there is a gap 902 between tubular glass sleeve 32a and handle 510 and between tubular glass sleeve 32a and glass core cane 511 when tubular glass sleeve 32a is situated around handle 510 and glass core cane 511. As shown in FIG. 2B, a removable insert 904 may be inserted into gap 902 to prevent movement of handle assembly 900 during the soot deposition process. Removable insert 904 may be removable such that once deposition of soot is complete, removable insert 904 may be removed to expose gap 902. Alternatively, portions of tubular glass sleeve 32a may be attached to corresponding portions of handle 510 and/or glass core cane 511 to prevent movement of tubular glass sleeve 32a during deposition of soot while still maintaining a gap between tubular glass sleeve 32a and handle 510 and between tubular glass sleeve 32a and glass core cane 511 at unattached portions. The portions of tubular sleeve 32a may be attached to corresponding portions of handle 510 and/or glass core cane 511 through, for example, glass-to-glass tack welds. FIG. 2C illustrates gas flow 906 from soot preform during further processing steps. As shown, gas flow 906 passes into, and along the length of, gap 902 and out of handle assembly 900. As shown in FIGS. 2A-2C, handle 510 may include a ball portion 908. Ball portion 908 aids in supporting the soot preform during transport and when the soot preform is suspended in a furnace.

Figure 3A:
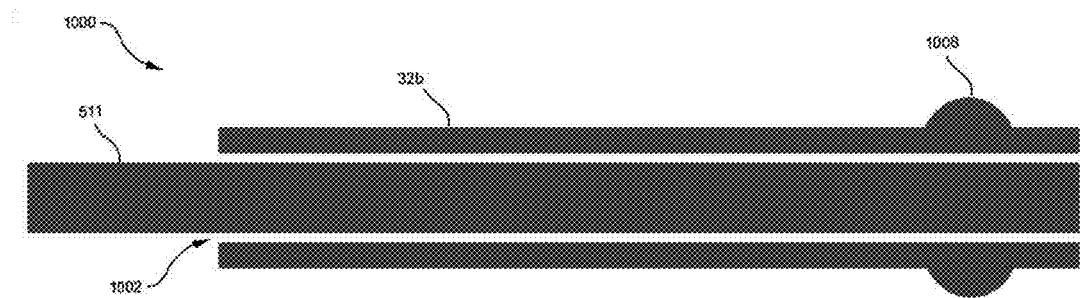
FIG. 3A is a cross-sectional view of a handle in accordance with an embodiment of the present disclosure.
Figure 3B:
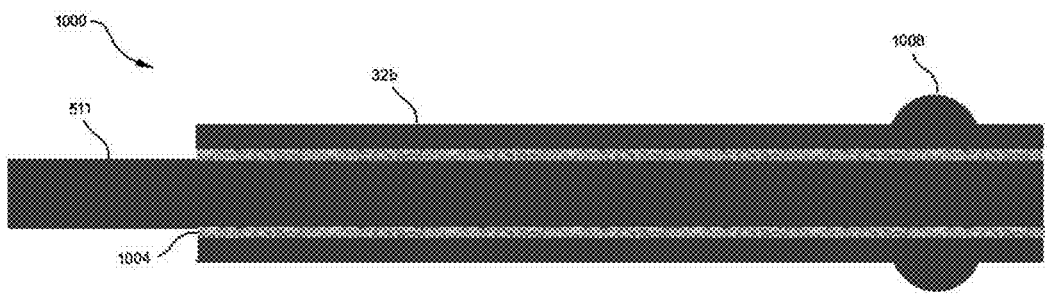
FIG. 3B is a cross-sectional view of a handle in accordance with an embodiment of the present disclosure.
Figure 3C:
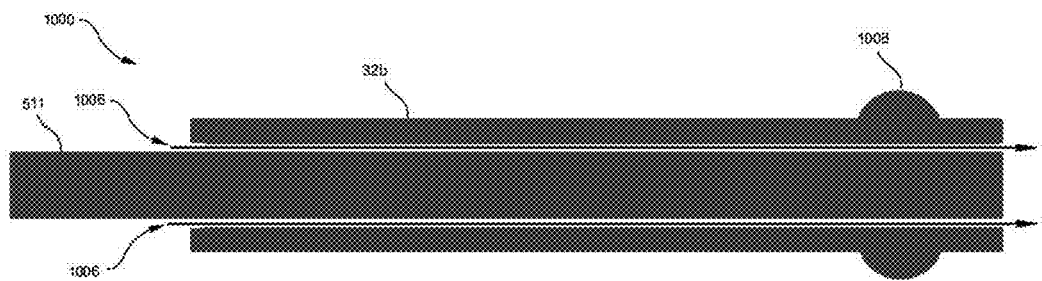
FIG. 3C is a cross-sectional view of a handle in accordance with an embodiment of the present disclosure.

FIGS. 3A-3C illustrate an exemplary handle assembly 1000 in accordance with an embodiment of the present disclosure. Handle assembly 1000 includes a tubular glass sleeve 32b situated around a portion of glass core cane 511. As shown, the inner diameter of tubular glass sleeve 32b is greater than the outer diameter of glass core cane 511 such that there is a gap 1002 between tubular glass sleeve 32b and glass core cane 511 when tubular glass sleeve 32b is situated around glass core cane 511. As shown in FIG. 3B, a removable insert 1004 may be inserted into gap 1002 to prevent movement of handle assembly 1000 during the soot deposition process. Removable insert 1004 may be removable such that once deposition of soot is complete, removable insert 1004 may be removed to expose gap 1002. Alternatively, portions of tubular glass sleeve 32b may be attached to corresponding portions glass core cane 511 to prevent movement of tubular glass sleeve 32b during deposition of soot while still maintaining a gap between tubular glass sleeve 32b and glass core cane 511 at unattached portions. The portions of tubular sleeve 32b may be attached to corresponding portions of glass core cane 511 through, for example, glass-to-glass tack welds. FIG. 3C illustrates gas flow 1006 from soot preform during further processing step. As shown, gas flow 1006 passes into, and along the length of, gap 1002, and out of handle assembly 1000. As shown in FIGS. 3A-3C, tubular glass sleeve 32b may include a ball portion 1008. Ball portion 1008 aids in supporting the soot preform during transport and when the soot preform is suspended in a furnace.

Removable insert 904, 1004 may be of any suitable material including, but not limited to, glass, rubber and Teflon. Removable insert 904, 1004 may have any shape suitable for maintaining gap 902, 1002. For example, removable insert 904, 1004 may be a tubular sleeve having an inner diameter greater than the outer diameter of glass core cane 511, and having an outer diameter less than the inner diameter of tubular glass sleeve 32a shown in FIGS. 2A-2C or of handle 510 shown in FIGS. 3A-3C. To promote ease of removal, removable insert 904, 1004 may also include two separate semi-annular portions, or three or more separate portions, that fit into, and maintain, gap 902, 1002. To further promote ease of removal, removable insert 904, 1004 may be tapered. By tapered, it is meant that the wall thickness of removable insert 904, 1004 decreases along the length of removable insert 904, 1004 such that the outer diameter of removable insert 904, 1004 decreases along the length of removable insert 904, 1004, but the inner diameter of removable insert 904, 1004 remains constant along the length of removable insert 904, 1004. Removable insert 904, 1004 may also have any length suitable for maintaining gap 902, 1002. However, for ease of removal, removable insert 904, 1004 may have a length which allows removable insert 904, 1004 to extend beyond the length of tubular glass sleeve 32a in the direction of handle 510 shown in FIGS. 2A-2C, or beyond an upper portion of handle 510 shown in FIGS. 3A-3C. Such extension facilitates contacting removable insert 904, 1004 and removing removable insert 904, 1004 from gap 902, 1002.

Alternatively, removable insert 904, 1004 may be a porous material such as a porous silica soot material. Where a porous material is used, it is not necessary to remove removable insert 904, 1004 from gap 902, 1002. Instead, the open pores of the porous material provide a pathway through which gas may flow from the soot preform and out of handle assembly 900, 1000.

Figure 4A:
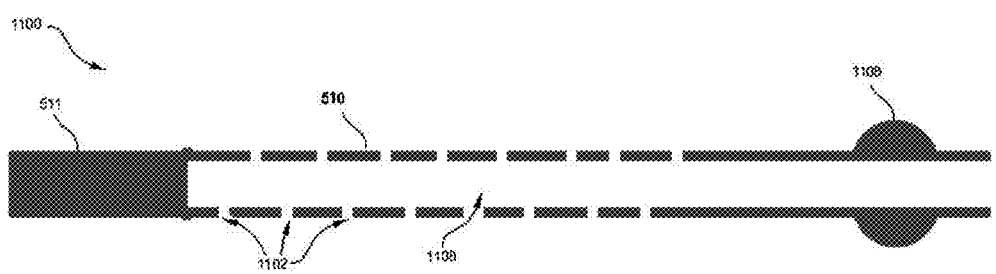
FIG. 4A is a cross-sectional view of a handle in accordance with an embodiment of the present disclosure.
Figure 4B:
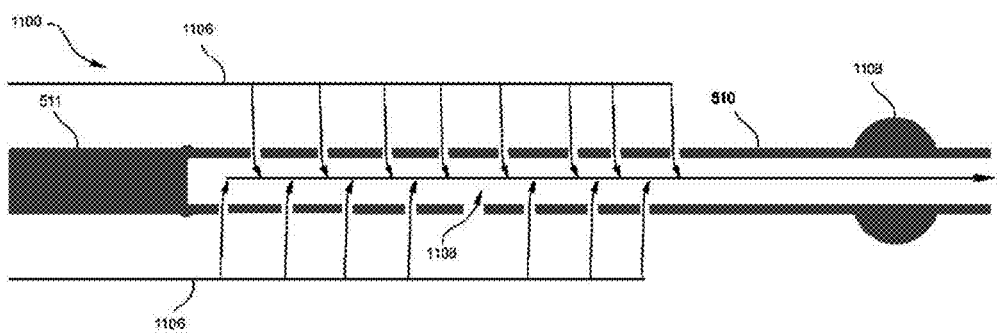
FIG. 4B is a cross-sectional view of a handle in accordance with an embodiment of the present disclosure.

FIGS. 4A-4B illustrate an exemplary handle assembly 1100 in accordance with an embodiment of the present disclosure. Handle assembly 1100 includes a handle 510 attached to a glass core cane 511. The outer diameter of handle 510 may be approximately equal to the outer diameter of glass core cane 511. As shown, handle 510 includes a hollow interior 1108 extending from the top of handle 510 toward an end attached to glass core cane 511. Hollow interior 1108 may have a length nearly equal to the length of handle 510. For example, hollow interior 1108 may be greater than about 50% of the length of handle 510, greater than about 70% of the length of handle 510, or greater than about 80% of the length of handle 510, or even greater than about 90% of the length of handle 510. Handle 510 may also include openings 1110 that fluidly connect the exterior of handle 510 with hollow interior 1108 of handle 510. FIG. 4B illustrates gas flow 1106 from soot preform during further processing steps. As shown, gas flow 1106 passes through openings 1110, into, and along the length of, hollow interior 1108, and out of handle assembly 1100. As shown in FIGS. 4A-4B, handle 510 may include a ball portion 1108. Ball portion 1108 aids in supporting the soot preform during transport and when the soot preform is suspended in a furnace.

Once formed, the soot preform may be suspended in a muffle furnace and further processing steps, such as, but not limited to, heating, drying, doping and sintering, may be performed. For example, the soot preform may be heated and/or contacted with a drying agent in the furnace to dry the soot preform. Similarly, the soot preform may be contacted with a doping agent in the furnace to dope the soot preform. The soot preform may also be contacted with a sinter gas such as, but not limited to, helium, and heated to sinter at least some portion of the soot preform. During some, or all, of the processing steps, an upper portion of the handle assembly may be mated to a vacuum connection, and a vacuum may be applied to the handle assembly to facilitate increased flow of processing agents and/or processing gases into the soot preform, through porous portions of the preform, and/or out of the furnace through the handle assembly. For example, as shown in FIG. 2C, application of vacuum facilitates gas flow 906 from soot preform into, and along the length of, gap 902 and out of handle assembly 900. Similarly, as shown in FIG. 3C, application of vacuum facilitates gas flow 1006 from soot preform into, and along the length of, gap 1002, and out of handle assembly 1000. As further shown in FIG. 4B, application of vacuum facilitates gas flow 1106 from soot preform through openings 1110, into, and along the length of, hollow interior 1108, and out of handle assembly 1100. Such increased flow increases the rate of the processing steps and reduces the period for completing the additional processing steps. Through gas flows 906, 1006, 1106 are described in relation to the application of vacuum to the handle assembly, this description is not meant to be limiting. Embodiments of the present disclosure facilitate gas flow during processing of a soot preform with and without the application of vacuum to the handle assembly.

For example, where the furnace temperature is increased to a sintering temperature of about 1,600° C., allows for shortened periods to form a fully consolidated glass preform suitable for drawing into an optical fiber. The soot preform may be maintained at a sintering temperature for a period of about 30 minutes to about 4.0 hours. The temperature ramp rate may be greater than about 15° C. per minute, or greater than about 25° C. per minute, or even greater than about 50° C. per minute. These ramp rates are in contrast to temperature ramp rates of less than about 10° C./minute which are conventionally applied so that gas does not become trapped in closed pores as the furnace temperature is increased to a sintering temperature. Application of a vacuum facilitates drawing of sinter gas into the soot preform, while also evacuating gas from the pores of the soot preform. As gas in the pores of the soot preform is evacuated, the amount of gas that may be trapped and expanded during sintering is reduced or eliminated, and the densification of the soot preform at the high temperature ramp rates disclosed herein yields a substantially void-free glass.

Where applying a vacuum is discussed herein, vacuum at about 0.01 atm to about 0.25 atm may be applied to the handle assembly. According to embodiments of the present disclosure, when a vacuum is applied to the handle assembly, the furnace pressure (Fp) outside of the soot preform is greater than the pressure inside of the soot preform. For example, the pressure inside the soot preform may be less than or equal to about 0.25 Fp. As a further example, Fp may be about 1.0 atmosphere pressure, absolute. Application of a vacuum to the handle assembly may result in a flow rate of gas out of the soot preform of greater than about 100 sccm (standard cubic centimeters per second). The flow rate of gas out of the soot preform may even be greater than about 1,000 sccm. Application of a vacuum to the handle assembly may shorten the period to perform each processing step.

The glass preform formed in accordance with the present disclosure may be placed in a holding oven for gas diffusion for significantly shorter periods of time than glass preforms formed using conventional techniques. The gas diffusion period of embodiments of the present disclosure may be reduced by a factor greater than about 4, or by a factor greater than about 8, or even by a factor greater than about 16, as compared to gas diffusion periods of conventional techniques. In instances where there is no interstitial gas in glass preform, glass preform may not need to be placed in a holding oven.

Handle designs according to embodiments of the present disclosure may contribute to significantly reducing process time associated with heating, drying, doping and sintering soot preforms. The handle designs may also contribute to significant reductions in the period for gas diffusion from the glass preform. Gap 902 as shown in FIGS. 2A-2C, gap 1002 as shown in FIGS. 3A-3C, and openings 1110 in conjunction with hollow interior 1108 shown in FIGS. 4A-4B, provide paths for gas to flow out of the soot preform without becoming trapped. Furthermore, gap 902, gap 1002, and openings 1110 in conjunction with hollow interior 1108, provide paths for gas to be evacuated from a soot preform as less porous or densified portions are formed during soot preform processing.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for forming an optical fiber preform, the method comprising:
   inserting a glass core cane into a glass sleeve such that the glass sleeve surrounds a portion of the glass core cane and such that there is a gap between the glass sleeve and the portion of the glass core surrounded by the glass sleeve, the glass sleeve having an inner diameter that is greater than an outer diameter of the glass core cane;
   inserting a removable insert in the gap between the glass sleeve and the portion of the glass core cane surrounded by the glass sleeve, the removable insert having a length at least equal to the length of the glass sleeve,
   depositing silica soot onto at least a portion of the glass core cane and at least a portion of the glass sleeve to form a silica soot preform; and
   flowing gas through the gap during processing of the silica soot preform.

2. The method of claim 1, wherein the removable insert comprises a porous silica soot material.

3. The method of claim 1, further comprising welding a portion of the glass sleeve to a portion of the glass core cane.

4. The method of claim 1, further comprising attaching a glass handle to an end of the glass core cane.

5. The method of claim 1, wherein processing of the silica soot preform comprises sintering the silica soot preform in a furnace to form a consolidated glass preform.

6. The method of claim 5, wherein sintering the silica soot preform comprises raising the temperature of the furnace to a sintering temperature at a rate of greater than about 15° C. per minute.

7. The method of claim 6, wherein the sintering temperature is about 1,600° C.

8. The method of claim 1, further comprising applying a vacuum to the gap between the glass sleeve and the portion of the glass core cane surrounded by the glass sleeve.

9. The method of claim 8, wherein applying a vacuum comprises creating a pressure difference between the pressure outside the silica soot preform (Fp) and the pressure inside the silica soot preform, wherein the pressure inside the soot preform is less than or equal to about 0.25 Fp.

10. The method of claim 9, wherein Fp is about 1.0 atmosphere pressure, absolute.

* * * * *